United States Patent
McCaster, III et al.

(10) Patent No.: US 6,926,369 B2
(45) Date of Patent: Aug. 9, 2005

(54) WHEEL ASSEMBLY

(76) Inventors: Tommie L. McCaster, III, 3555 E. 154th St., Apt. 1, Cleveland, OH (US) 44120; Jason T. Clifford, 3130 Terrybrook Dr., Suite 609, Winter Park, FL (US) 32792

( * ) Notice: Subject to any disclaimer, the term of this patent is extended or adjusted under 35 U.S.C. 154(b) by 13 days.

(21) Appl. No.: 10/729,170

(22) Filed: Dec. 5, 2003

(65) Prior Publication Data

US 2005/0121968 A1    Jun. 9, 2005

(51) Int. Cl.⁷ .............................................. B60B 7/20
(52) U.S. Cl. ............................. 301/37.25; 301/37.109
(58) Field of Search ...................... 301/37.101, 37.25, 301/37.26, 37.27, 37.108, 37.109, 108.1

(56) References Cited

U.S. PATENT DOCUMENTS

| | | | |
|---|---|---|---|
| 1,054,819 A | | 3/1913 | Blackshear |
| 3,155,430 A | * | 11/1964 | Schindler ................. 301/37.25 |
| 3,340,389 A | * | 9/1967 | Senseman ................... 362/500 |
| 4,270,805 A | * | 6/1981 | Spisak ...................... 301/37.35 |
| 4,381,537 A | * | 4/1983 | Hinrichs ..................... 362/500 |
| 4,793,658 A | * | 12/1988 | Brown ..................... 301/37.36 |
| 4,893,877 A | * | 1/1990 | Powell et al. ............... 362/464 |
| 5,490,342 A | | 2/1996 | Rutterman et al. |
| 5,497,302 A | * | 3/1996 | O'Donnell .................. 362/500 |
| 5,623,777 A | | 4/1997 | Hsiao et al. |
| 5,887,952 A | | 3/1999 | Gandellini |
| 6,116,762 A | * | 9/2000 | Kutlucinar .................. 362/500 |
| D444,119 S | | 6/2001 | Brintouch |
| 6,443,529 B1 | | 9/2002 | Williams |
| 6,517,167 B2 | | 2/2003 | Baker |
| 6,554,370 B2 | | 4/2003 | Fowlkes |

FOREIGN PATENT DOCUMENTS

| | | | |
|---|---|---|---|
| DE | 29615115 | * | 1/1997 |
| GB | 2265585 | * | 10/1993 |

OTHER PUBLICATIONS

Catalog page from "Boysstuff.co.uk" internet website showing wheel clock; Jul. 2004.*

Catalog page from "Bradfordbadges.com" website showing wheel clock; Jul. 2004; with "archive.org" pages showing usage back to 2001.*

* cited by examiner

Primary Examiner—Russell D. Stormer
(74) Attorney, Agent, or Firm—Rankin, Hill, Porter & Clark LLP

(57) ABSTRACT

The present invention provides a wheel assembly for a motor vehicle. The wheel assembly includes a rim for a tire and a hub including a central portion and a connecting portion that radiates from the central portion to the rim. A plurality of lug holes are formed in a central portion of the hub through which lug studs pass when a rear side of the central portion is mounted against an axle hub of a motor vehicle. A functioning clock is mounted to a front side of the connecting portion of the hub to conceal the lug holes from view.

14 Claims, 5 Drawing Sheets

WHEEL ASSEMBLY

BACKGROUND OF THE INVENTION

1. Field of Invention

The present invention relates to a wheel assembly for a motor vehicle. More particularly, the present invention relates to a wheel assembly for a motor vehicle that includes a functioning clock mounted to a front side of a connecting portion of a hub.

2. Description of Related Art

The wheels of motor vehicles are usually adorned with some type of ornamentation or decoration to make them more aesthetically pleasing. In some cases, decorative hubcaps or wheel covers are attached to the wheels. The decorative hubcaps or wheel covers rotate with the wheels and thus provide decoration only when the motor vehicle is stationary.

In recent years, it has become popular for the entire wheel, including the rim portion and the hub portion, to be integrally formed from a lightweight aluminum alloy. So-called "alloy wheels" are often engineered to provide three-dimensional styling that is both aesthetically pleasing and functional.

Attempts are constantly being made to produce unique wheels and/or wheel covers for use on motor vehicles. An increasingly popular type of wheel assembly includes a wheel spinner that rotates independent of the wheel to which it is attached. An example of one such wheel spinner assembly is disclosed in Fowlkes, U.S. Pat. No. 6,554,370. Although wheel assemblies having independently rotatable wheel spinners are presently popular, other unique types of decorative and functional wheel assemblies are desired.

BRIEF SUMMARY OF THE INVENTION

The present invention provides a wheel assembly that can be mounted to an axle hub of a motor vehicle. The wheel assembly according to the invention comprises a functioning clock that is mounted to a front side of a connecting portion of a hub portion. The functioning clock conceals a plurality of lug holes provided in a central portion of the hub from view. In a preferred embodiment of the invention, the vertical orientation of at least a face portion of the functioning clock does not appear to substantially change as the hub rotates. Thus, when the wheel assembly is mounted on the axle hub of a motor vehicle, motorists and pedestrians can see the correct time displayed on the functioning clock when the motor vehicle is in motion.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
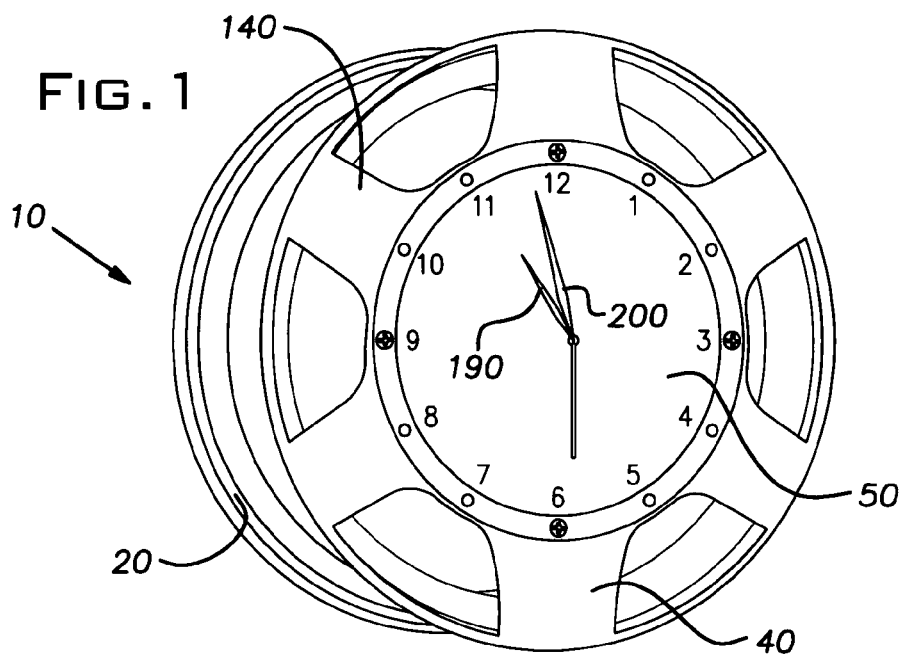
FIG. 1 is a perspective view of a wheel assembly according to the invention.
Figure 2:
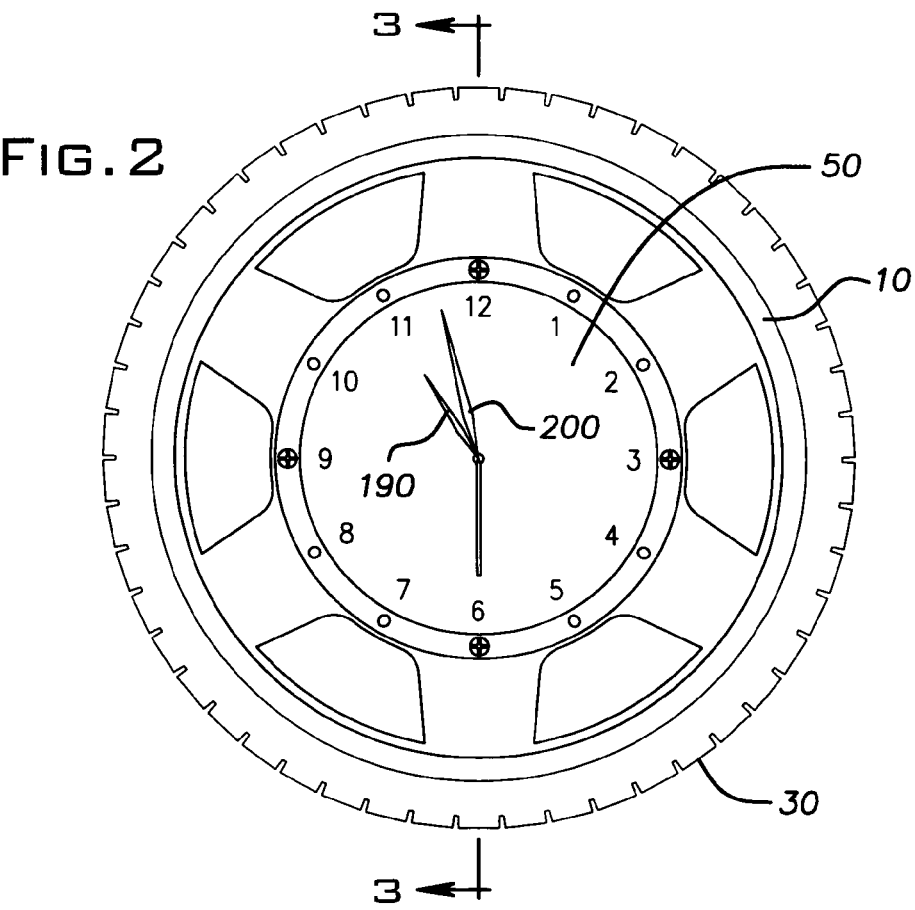
FIG. 2 is a front plan view of the wheel assembly shown in FIG. 1 having a tire mounted on the rim portion thereof.

With reference to accompanying FIGS. 1–5, a wheel assembly 10 according to the present invention generally comprises a rim 20 for a tire 30, a hub 40 and a functioning clock 50 mounted to the hub 40. As noted in FIG. 4, the hub 40 comprises a central portion 60 and a connecting portion 70 that radiates from the central portion 60 to the rim 20. The central portion 60 is provided with a plurality of lug holes 80 through which the lug studs projecting from an axle hub of a motor vehicle pass when a rear side 90 (see FIG. 3) of the central portion 60 is mounted against the axle hub. Lug nuts threaded onto the lug studs press against the central portion 60 of the hub 40 to hold the wheel assembly to the axle hub of the motor vehicle. Once the lug nuts are tightened on the lug studs, the functioning clock 50 is mounted to a front side 100 of the connecting portion 60 of the hub 40 to conceal the lug nuts and lug holes 80 from view.

In the presently most preferred embodiment of the invention, the rim 20 and hub 40 are integrally formed of a cast metal, preferably a lightweight aluminum alloy, in accordance with conventional alloy wheel casting methods. Splined, steel inserts can be pressed into the lug holes of the integrally formed rim 20 and hub 40 to provide a high-strength surface against which the lug nuts can be tightened. Alternatively, the rim 20 and hub 40 can be formed of steel or another high strength material. Although an integral rim 20 and hub 40 is preferred, it will be appreciated that the rim 20 and hub 40 can be formed of two or more components that are joined together by conventional means such as welding.

Preferably, the connecting portion 70 of the hub 40 comprises a bracket portion or frame for removably mounting the functional clock 50 thereto. The bracket portion is preferably not a separate component, but merely comprises an integral recessed ledge 120 formed in the connecting portion 70 of the hub 40 having mounting surface 130 provided with a plurality of threaded apertures for receiving threaded fasteners 290 that removably mount the functional clock 50 to the connecting portion 70 of the hub 40. The bracket portion can, but need not be, annular. Depending upon the desired final appearance of the wheel assembly, the bracket portion can be formed in the connecting portion 70 of the hub 40 proximal to the rim 20, proximal to the central portion 60 of the hub 40, or at any point therebetween.

The configuration and appearance of any of the connecting portion 70 of the hub that is not concealed by the functioning clock, which is hereinafter referred to as the exposed connecting portion, is one of aesthetic design choice. For example, the exposed connecting portion can be appear as a solid disc or a plurality of spokes 140 that are spaced apart a predetermined distance from each other. Spaced apart spokes 140 are preferred over solid discs for several reasons. Use of spaced apart spokes 140 tends to reduce the weight and material cost of the wheel assembly 10 as compared to a solid disc. Moreover, the air space between spokes 140 allows for ventilation and cooling of brake rotors situated proximal to the rear side of the hub.

And, spokes 140 are aesthetically pleasing and allow for the creation of unusual optical illusion effects.

In a preferred embodiment of the invention, the exposed connecting portion of the hub comprises a plurality of spokes 140 that are spaced apart a predetermined distance such that when the hub 40 rotates at a substantially constant predetermined speed, an optical illusion is created whereby the plurality of spokes 140 appear to a human observer to make about one clockwise revolution around the functioning clock per minute. This well known optical illusion effect is often referred to as a "strobe effect", which is produced because the human eye can process about 24 visual frames per second. When the spokes 140 are in the same relative position every $\frac{1}{24}$th of a second, the human eye perceives no movement. The spokes, although moving, appear to be stationary. If the hub rotates at a slightly faster speed, the spokes then appear to slowly rotate in a clockwise direction because their relative position is slightly different every $\frac{1}{24}$th of a second. Preferably, the hub rotates at the predetermined speed when the motor vehicle to which the wheel assembly is mounted is moving at a constant speed within the range of from about 20 to about 35 miles per hour. When the spokes are configured in this manner and the motor vehicle is driven at the predetermined constant speed, the spokes appear to a human observer to move like a sweeping second hand of a clock around the outside of the functioning clock.

Figure 3:
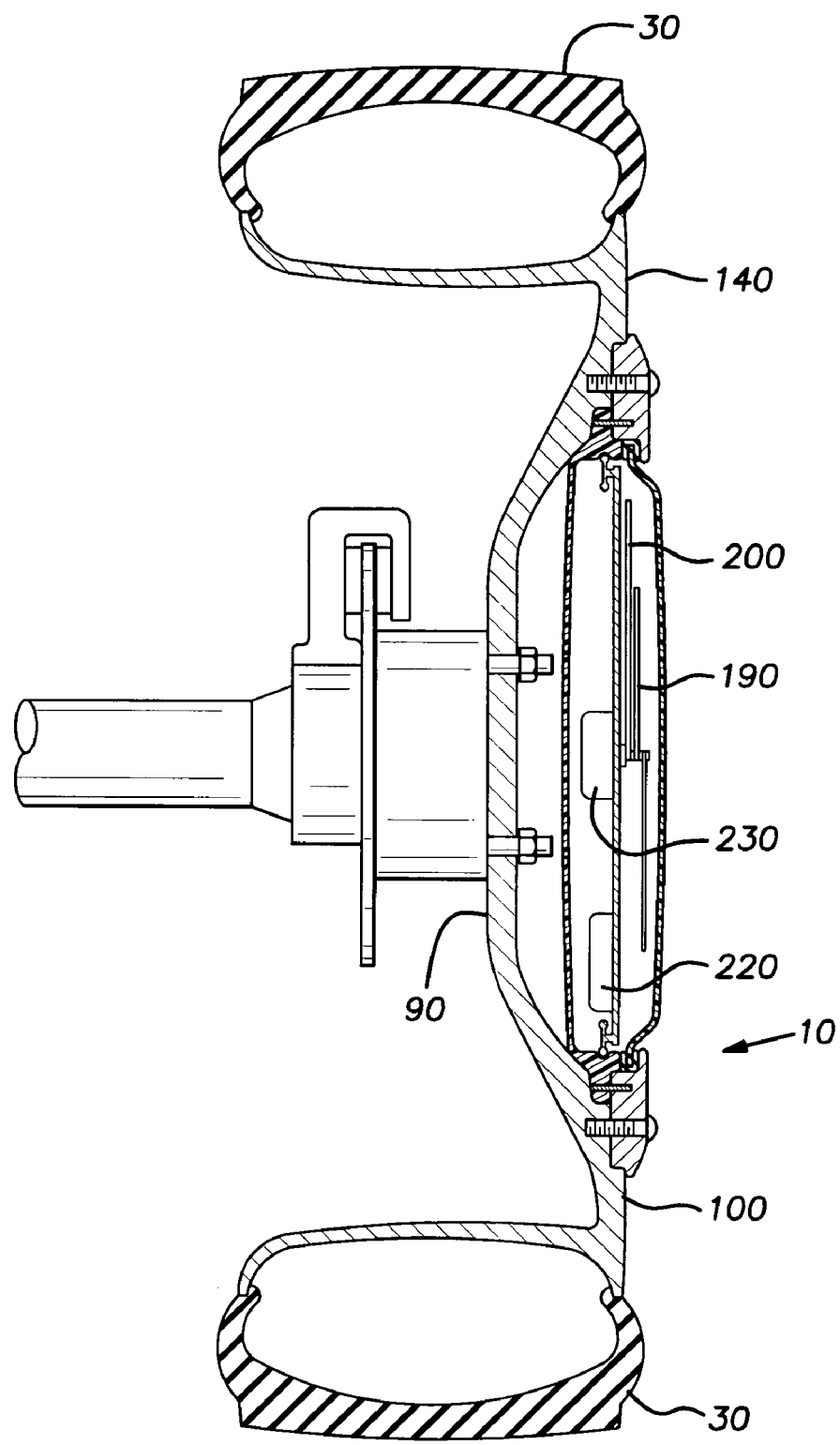
FIG. 3 is a side sectional view of the wheel assembly and tire shown in FIG. 2, as viewed in the direction of the arrows taken along the line 3—3.
Figure 4:
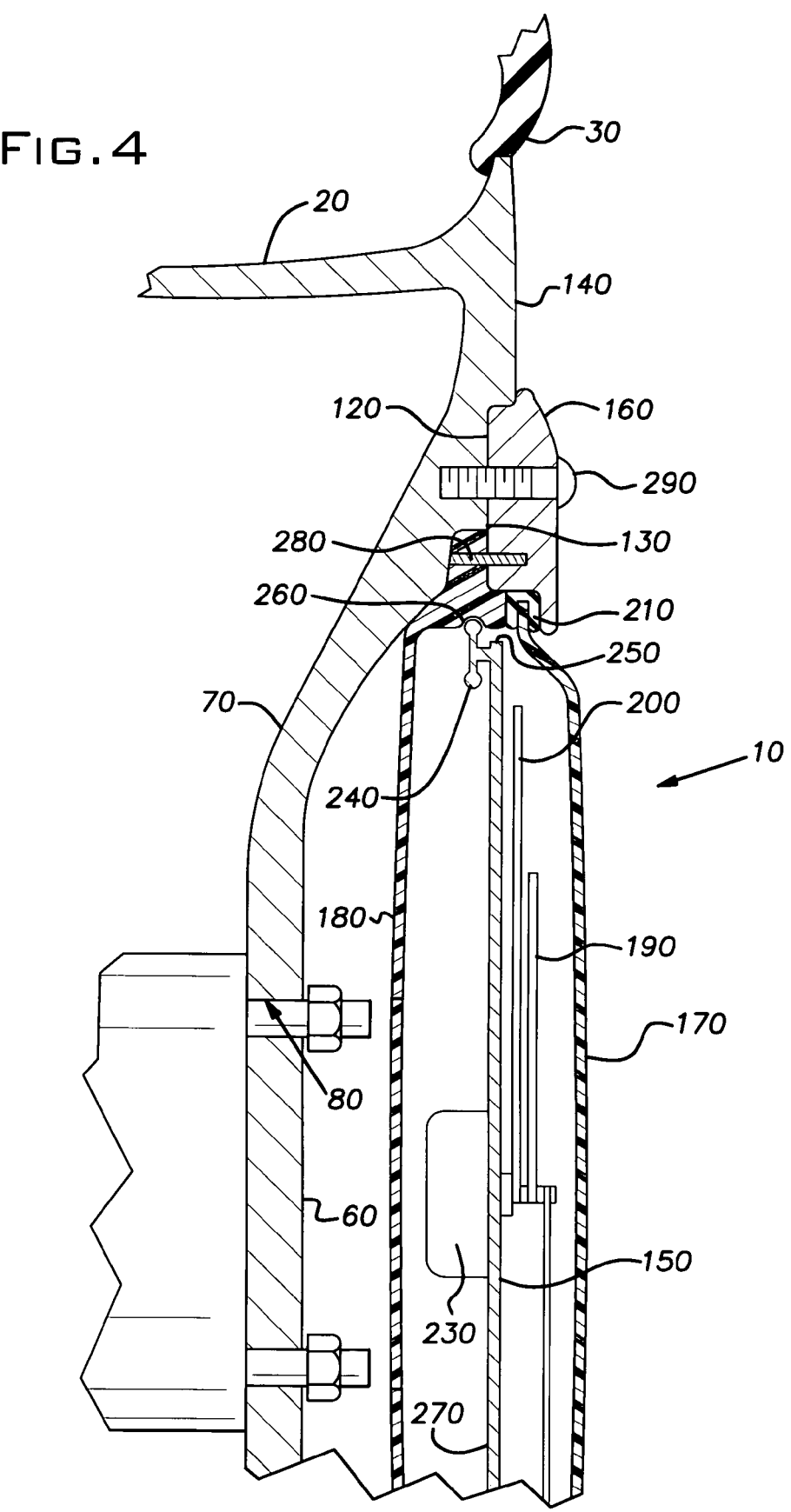
FIG. 4 is a detail view of a portion of FIG. 3.

With particular reference to FIG. 4, functioning clock preferably comprises a face portion 150 that displays the correct time, a bezel portion 160 that frames the face portion 150, a transparent or translucent crystal portion 170 that covers and protects the face portion 150 from damage, and a back case portion 180. Optimally, the face portion 150 of the functioning clock is encased within a substantially watertight sealed compartment defined by the bezel portion 160, the crystal portion 170 and the back case portion 180, as shown in FIG. 3. This sealed arrangement prevents brake dust, water and other debris from entering the compartment where it could interfere with the observation of the clock or with the mechanical operation of the clock.

Figure 6:
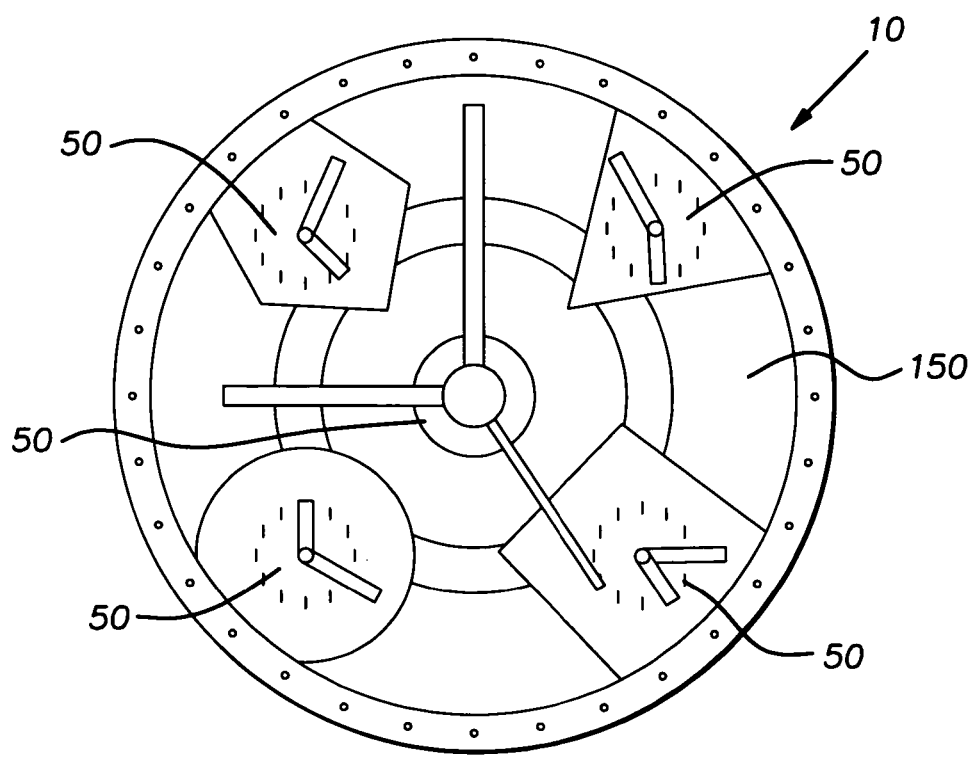
FIG. 6 is a front plan view of an alternative embodiment of a wheel assembly according to the invention.

In the presently most preferred embodiment of the invention, the face portion 150 of the functioning clock 50 comprises an analog clock having a sweeping hour hand 190, a sweeping minute hand 200 and optionally a sweeping second hand. The hour hand 190 and minute hand 200 can be mechanical components that physically rotate about a dial on the clock face or, alternatively, the hour hand and minute hand can be virtual in the sense that they appear due to the emission of light from a substrate using an LED array or an electroluminescent display means. It will be appreciated that the functioning clock can also be a digital clock, with the time being displayed numerically. If desired, the face portion 150 can be provided with a plurality of clocks such that the functioning clock portion 50 of the wheel assembly resembles a chronograph watch with a stop timer, such as shown in FIG. 6.

Analog clocks having moving hour hands 190 and second hands 200 can be purchased from a variety of suppliers. Most feature a quartz movement, which is extremely accurate. A high-torque quartz movement is preferred because the clock must operate in an environment where it exposed to frequent shock, vibration and temperature variation. Moreover, a high-torque quartz movement is usually necessary to drive the relatively large clock hands.

In one embodiment of the invention, the functioning clock further comprises a receiver that receives time signals transmitted via radio frequency and a controller that adjusts the time displayed by the functioning clock to match the time signal received by the receiver. Clock mechanisms having this feature are sometimes referred to as "atomic clocks" and are also commercially available.

The crystal portion 170 of the functioning clock 50 may be formed of glass, but is more preferably formed of a shatter resistant transparent or translucent material such as an acrylic polymer (e.g., PLEXIGLAS) or a polycarbonate polymer (e.g., LEXAN). As shown in FIG. 4, an elastomeric gasket 210 can be employed around the perimeter of the crystal portion 170 to insure that there is a watertight seal between the crystal portion 170 and the bezel portion 160. The crystal portion 170 is exposed to road salt and road debris when the wheel assembly is mounted to a motor vehicle and thus can become scratched or damaged. When this occurs, the bezel portion 160 of the functioning clock 50 can be removed to allow for installation of a replacement crystal portion 170.

The back case 180 of the functioning clock 50 can be formed of metal, but is preferably formed of a strong, lightweight polymeric material such as ABS plastic or a filled-reinforced polyolefin. The back case 180 preferably includes a removable access cover or panel, which allows for access to the rear side of the face portion when the functioning clock is not mounted to the connecting portion of the hub. Access is necessary in order to change batteries 220, which supply power to the clock mechanism 230.

Figure 5:
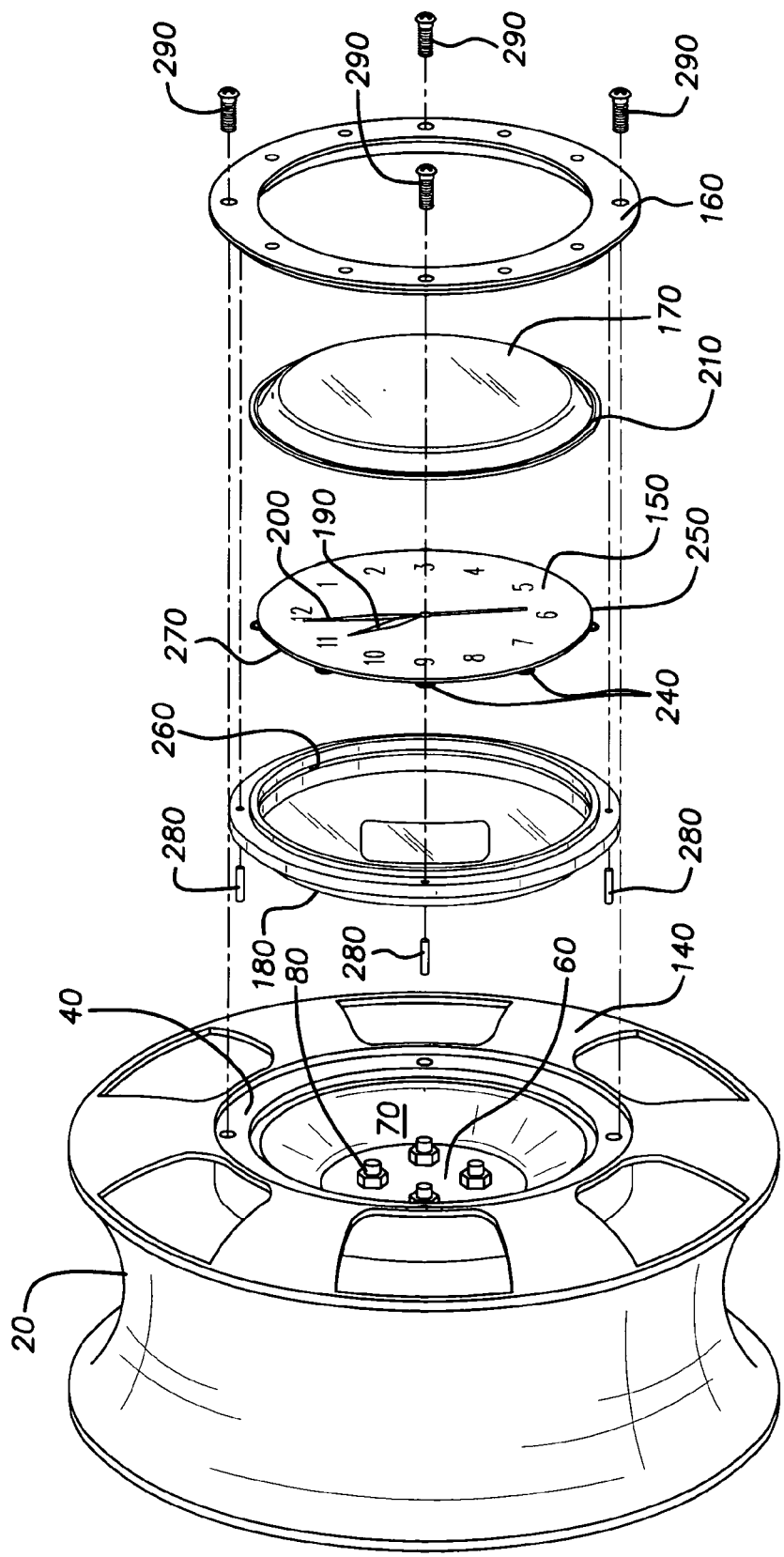
FIG. 5 is an exploded perspective view showing the various components comprising the wheel assembly shown in FIG. 1.

With reference to FIG. 5, the bezel portion 160 is preferably configured to receive threaded fasteners 290 that removably secure the functioning clock 50 to the connecting portion 70 of the hub 40. More preferably, at least one of the fasteners is a lockable fastener, which deters theft of the functioning clock portion 50. Simulated jewels, light emitting diodes (LED's) and other forms of indicia and/or ornamentation can be applied to or formed in the bezel portion 160, as desired.

It will be appreciated that should the functioning clock be stolen, become damaged or otherwise become separated from the hub, or should the owner of the wheel assembly simply desire a change the appearance of the wheel assembly, a new functioning clock unit can be easily mounted to the connecting portion of the hub in place of the prior functioning clock unit. Thus, one of the advantages of the present invention is that the bracket portion is adapted to receive any one of a plurality of interchangeable functional clock units, which have the same or different appearance.

If the face portion of the functioning clock 50 is fixedly connected to the bezel portion and the bezel portion is mounted to the hub, the face portion of the functioning clock will rotate with the hub as the hub rotates. However, this is disadvantageous in that it is not possible to accurately determine the time by viewing the face portion of the functioning clock when the wheel assembly is mounted to a motor vehicle that is in motion. Accordingly, it is highly preferable for the orientation of at least the face portion of the functioning clock to not appear to substantially change when the hub is rotated.

With reference to FIG. 4, one way to substantially maintain the orientation of the face portion 150 of the functioning clock 50 relative to vertical while the hub 40 is rotating is to bottom-weight the face portion 150 and provide a plurality of roller bearings 240 at the perimeter 250 of the face portion 150 that contact an inner annular bearing surface 260, race or groove, which can be provided in the back case 180 as shown in FIG. 4. It will be appreciated that the inner annular bearing surface 260 could alternatively be formed in the bezel portion 160, or be formed between the back case 180 and bezel portion 160. Preferably, the inner annular bearing surface 260 is formed entirely in the back case 180. By making the bottom hemisphere of the face portion heavier with respect top hemisphere of the face portion and by providing rolling bearings 240 between the face portion 150 and the inner annular bearing surface 160, the forces of gravity and inertia tend to substantially maintain the vertical orientation of the face portion 150 as the hub 40 is rotated. The bottom hemisphere of the face portion can be made to be heavier than the top hemisphere of the face portion, at least in part, by locating the batteries 220 on the back or rear side 270 of the lower hemisphere of the face portion 150. Additional weights (not shown) can also be added, if necessary.

Motor vehicles are often operated at night and in other low light environments. Thus, it is preferably that the face portion of the functioning clock be illuminated. To accomplish this object, the functional clock preferably further comprises a light source for illuminating the face portion and a power source for the light source. The power source can be one or more batteries 220, which also power the clock mechanism 230.

The light source can be an LED display, which can be mounted in any desirable location including the hands of the clock, at the number positions, or both places. Alternatively, the light source can be an electroluminescent EL display that is printed or applied to at least a portion of the face portion of the functioning clock. In yet another embodiment, the face portion is translucent, and one or more light emitting sources are positioned on a rear or back side of the face portion to transmit light through the face portion and thus make it appear to be luminous.

When the wheel assembly includes a light source, it is preferable that the wheel assembly further comprise a controller for switching power on and off from the power source to the light source. In a preferred embodiment of the invention, the functioning clock further comprises a receiver for receiving signals from a hand-held remote control device. The controller switches power on or off from the power source to the light source based upon the signals received by the receiver from the hand-held remote control device. Thus, an owner of a wheel assembly according to the invention can press the remote control device, such as a fob on a key chain, to turn the light source on the wheel assembly on or off, as the case may be.

Optimally, the functioning clock further comprises a motion sensor for detecting when the hub is rotating and/or a photo sensor for detecting when the wheel assembly is in a low light environment. The controller switches on power from the power source to the light source when the motion sensor detects that the hub is rotating and/or the photo sensor detects that the wheel assembly is in a low light environment. Preferably, the controller does not switch off power from the power source to the light source until a predetermined period of time has elapsed after the motion sensor detects that the hub has stopped rotating. Thus, when a motor vehicle equipped with the wheel assembly according to the invention is operated, the controller switches on power to the light source when the motion sensor detects that the hub is rotating. When the vehicle stops rotating momentarily, such as at a traffic light, the controller does not immediately turn off power to the light source, but rather it continues to allow power to flow to the light source for an predetermined period of time, such as three minutes. If the hub begins to rotate once again prior to the expiration of the predetermined time, a counter is reset and power continues to flow to the light. If, however, the wheel ceases to rotate upon the expiration of the predetermined time, such as when the motor vehicle is parked, the controller switches off power to the light source.

FIG. 5 is an exploded perspective view showing the various components comprising the wheel assembly shown in FIG. 1. To assemble the wheel assembly 10 according to this illustrated embodiment, the gasket 210 is first secured around the perimeter of the crystal portion 170. Next, the bezel portion 160 is properly positioned over the crystal portion 170 such that the gasket 210 is properly seated between the two components. Next, the face portion 150 of the functioning clock 50 is positioned onto the back case 180 such that the roller bearings 240 are in contact with the inner annular bearing surface 260. To facilitate installation of the face portion 150 in the back case 180, the roller bearings 240 can be spring loaded, which also helps reduce the shock and vibration transmitted to the clock mechanism 230. Once the face portion 150 of the functioning clock 50 is properly positioned within the back case 180, the bezel portion 160 and back case portion 180 are brought together and secured using fasteners 280. The rear access panel of the back case 180 can be removed, if necessary, to facilitate the installation of batteries 220, which are received on the rear side of the face portion 150 on the bottom hemisphere of the face portion 150. A tire 30 is mounted to the rim 20, and then the central portion 60 of the hub 40 is positioned against the axle hub of a motor vehicle. Lug nuts are tightened down on lug studs, which project through the lug holes 80 formed in the central portion 60 of the hub 40. Once the lug nuts have been sufficiently tightened, the functioning clock 50 is mounted to the connecting portion 60 of the hub 40, preferably using fasteners 290. The wheel assembly 10 can be removed from the motor vehicle in the reverse order in which it was installed.

Figure 7:
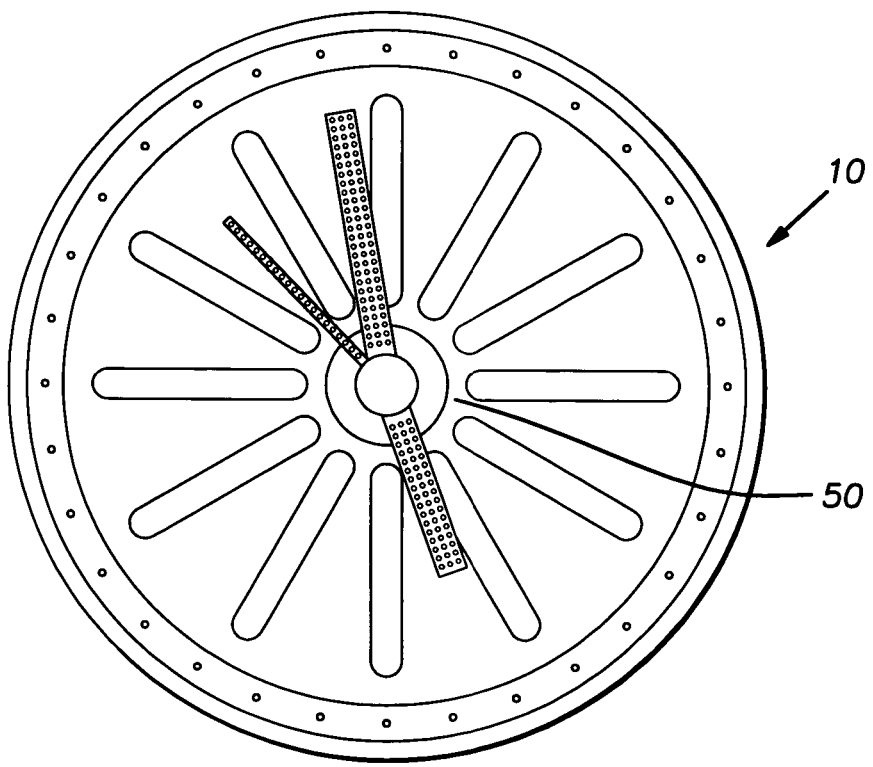
FIG. 7 is a front plan view of another alternative embodiment of a wheel assembly according to the invention.

FIGS. 6 and 7 are front plan views of alternative embodiments of wheel assemblies 10 according to the invention. In FIG. 6, a plurality of functioning clocks 50 are provided on the face portion 150. Each functioning clock can display the time in a separate time zone, or can have other functionality such as a stop watch or countdown feature. In FIG. 7, the hands of the functioning clock 50 are adorned with LED's of differing colors, which is both functional and aesthetically pleasing.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:
1. A wheel assembly comprising:
a rim for a tire;
a hub comprising a central portion and a connecting portion radiating from the central portion to the rim, wherein the central portion is provided with a plurality of lug holes through which lug studs pass when a rear side of the central portion is mounted against an axle hub of a motor vehicle; and
a functioning clock removably mounted to a front side of the connecting portion of the hub so as to conceal lug nuts tightened down on the lug studs from view when the wheel assembly is viewed from a front plan perspective;
wherein at least a face portion of the functioning clock does not rotate with the hub when the rear side of the central portion of the hub is mounted against an axle hub of a motor vehicle and the hub is rotating.

2. The wheel assembly according to claim 1 wherein the functioning clock further comprises a bezel portion that frames the face portion, and a transparent or translucent crystal portion that contacts the bezel portion and covers and protects the face portion.

3. The wheel assembly according to claim 2 wherein the face portion of the functioning clock is encased within a substantially watertight sealed compartment defined by the bezel portion, the crystal portion and a back case portion connected to the bezel portion.

4. The wheel assembly according to claim 1 wherein the face portion of the functioning clock comprises an analog clock having an hour hand and a minute hand.

5. The wheel assembly according to claim 4 wherein the hour hand and minute hand are formed on the face portion by an electroluminescent display.

6. The wheel assembly according to claim 1 wherein the hub and rim are integrally formed of metal.

7. The wheel assembly according to claim 1 further comprising a light source for illuminating the face portion of the functioning clock and a power source for providing power to the light source.

8. The wheel assembly according to claim 7 further comprising a controller for switching power on and off from the power source to the light source.

9. The wheel assembly according to claim 8 further comprising a receiver for receiving a transmitted time signal, and wherein the controller adjusts the time displayed by the functioning clock to match the transmitted time signal received by the receiver.

10. The wheel assembly according to claim 1 wherein the connecting portion of the hub comprises a bracket portion for removably mounting the functional clock to the hub.

11. The wheel assembly according to claim 10 wherein the bracket portion is adapted to receive any one of a plurality of interchangeable functional clocks that have a different appearance.

12. The wheel assembly according to claim 1 wherein the connecting portion of the hub comprises a plurality of spokes that are spaced apart a predetermined distance such that when the connecting portion of the hub rotates at a substantially constant predetermined speed, an optical illusion is created whereby the plurality of spokes appear to a human observer to make about one clockwise revolution around the bezel portion of the functioning clock per minute.

13. A wheel assembly comprising:
a rim for a tire;
a hub comprising a central portion and a connecting portion radiating from the central portion to the rim, wherein the central portion is provided with a plurality of lug holes through which lug studs pass when a rear side of the central portion is mounted against an axle hub of a motor vehicle; and
a functioning clock removably mounted to a front side of the connecting portion of the hub so as to conceal lug nuts tightened down on the lug studs from view;
wherein the orientation of at least a face portion of the functioning clock does not appear to substantially change when the central portion of the hub of the wheel assembly is mounted against the axel hub of a motor vehicle that is in motion and the hub is rotating;
wherein the functioning clock further comprises a bezel portion that frames the face portion, and a transparent or translucent crystal portion that contacts the bezel portion and covers and protects the face portion;
wherein the face portion of the functioning clock is encased within a substantially watertight sealed compartment defined by the bezel portion, the crystal portion and a back case portion connected to the bezel portion; and
wherein the bezel portion is mounted to the connecting portion of the hub and the face portion is provided with a plurality of roller bearings configured to contact an inner annular bearing surface formed in the back case portion, and wherein the inner annular bearing surface thereby supports the face portion of the functioning clock.

14. The wheel assembly according to claim 13 wherein a bottom hemisphere of the face portion is heavier than a top hemisphere of the face portion, the difference in weight being sufficient to maintain the vertical orientation of the face portion notwithstanding rotation of the hub.

* * * * *